US012637543B2

(12) United States Patent
Kyran et al.

(10) Patent No.: US 12,637,543 B2
(45) Date of Patent: May 26, 2026

(54) THERMOPLASTIC-THERMOSET HYBRID RESINS, METHODS, AND USES THEREOF

(71) Applicant: KANEKA CORPORATION, Osaka (JP)

(72) Inventors: Samuel Kyran, Pasadena, TX (US); Masahiko Miyauchi, Osaka (JP); Tianlei Zhou, Pasadena, TX (US)

(73) Assignee: KANEKA CORPORATION, Osaka (JP)

( * ) Notice: Subject to any disclaimer, the term of this patent is extended or adjusted under 35 U.S.C. 154(b) by 725 days.

(21) Appl. No.: 17/916,490

(22) PCT Filed: Mar. 31, 2021

(86) PCT No.: PCT/IB2021/020016

§ 371 (c)(1),
(2) Date: Sep. 30, 2022

(87) PCT Pub. No.: WO2021/198793

PCT Pub. Date: Oct. 7, 2021

(65) Prior Publication Data

US 2023/0174718 A1 Jun. 8, 2023

Related U.S. Application Data

(60) Provisional application No. 63/127,653, filed on Dec. 18, 2020, provisional application No. 63/002,948, filed on Mar. 31, 2020.

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08G 73/10*** | (2006.01) |

(52) U.S. Cl.

CPC ....... *C08G 73/101* (2013.01); *C08G 73/1025* (2013.01); *C08G 73/1032* (2013.01); *C08G 73/1071* (2013.01)

(58) Field of Classification Search

CPC .... C08G 14/06; C08G 14/14; C08G 73/1071; C08G 73/06; C08G 73/1032; C08G 73/1025; C08G 73/101; C08L 2203/16

USPC ............... 522/134, 1, 6, 189, 184, 71; 520/1

See application file for complete search history.

(56) References Cited

U.S. PATENT DOCUMENTS

| | | | | |
|---|---|---|---|---|
| 8,852,382 | B2 | 10/2014 | Setiabudi | |
| 9,695,273 | B2 | 7/2017 | Gorodisher et al. | |
| 10,023,698 | B2 * | 7/2018 | Gorodisher | C07D 265/16 |

FOREIGN PATENT DOCUMENTS

| | | | | |
|---|---|---|---|---|
| CN | 110655650 | A * | 1/2020 | C08G 73/1071 |
| JP | 2018200470 | A | 12/2018 | |
| WO | WO-2010138662 | A2 * | 12/2010 | C08L 71/126 |
| WO | 2018003725 | A1 | 1/2018 | |

OTHER PUBLICATIONS

Lu et al, CN 110655650 Machine Translation, Jan. 7, 2020 (Year: 2020).*

International Search Report issued in corresponding International Application No. PCT/IB2021/020016; mailed Jun. 22, 2021 (3 pages).

Written Opinion of the International Searching Authority issued in corresponding International Application No. PCT/IB2021/020016; dated Jun. 22, 2021 (4 pages).

Öh. Oie et al., "Polyaddition of bifunctional 1,3-benzoxazine and 2-methylresorcinol," Journal of Polymer Science, Part A: Polymer Chemistry, 2013 (6 pages).

J. Wang et al, "Latent curing systems stabilized by reaction equilibrium in homogeneous mixtures of benzoxazine and amine," Scientific Reports, No. 6.38584, Dec. 5, 2016 (7 pages).

A.W. Kawaguchi, "Polymerization-Depolymerization System Based on Reversible Addition-Dissociation Reaction of 1,3-Benzoxazine with Thiol," ACS Macro Lett., No. 2, pp. 1-4, 2013 (4 pages).

* cited by examiner

*Primary Examiner* — Jessica Whiteley

(74) *Attorney, Agent, or Firm* — Osha Bergman Watanabe & Burton LLP

(57) ABSTRACT

A hybrid thermoplastic-thermosettable resin composition may include a polymeric backbone formed from a thermoplastic unit, and at least one crosslinkable group bonded to the thermoplastic. A method of forming a hybrid thermoplastic-thermosettable resin composition may include reacting a thermoplastic to introduce a cross-linkable group to form the thermoplastic-thermosettable resin composition. A method of forming a hybrid thermoplastic-thermoset resin may include providing a hybrid thermoplastic-thermosettable resin composition comprising a polymeric backbone formed from a thermoplastic unit, and at least one crosslinkable group bonded to the thermoplastic; and curing the hybrid thermoplastic-thermosettable resin composition by an external stimulus to form the hybrid thermoplastic-thermoset resin.

16 Claims, 8 Drawing Sheets

RODA

BPADA

PAP

PEI-BZ end-cap-type hybrid resin

PEI-BZ main-chain-type hybrid resin

PEI-BZ main-chain-type hybrid resin with chain-stopper

FIG. 8

| | PI-2-BZ-E | PI-2-BZ-E | PI-2-BZ-E | PI-1-BZ-M | MPD type BZ P-d Shikoku | Bis-A type BZ XU 35610 Huntsman |
|---|---|---|---|---|---|---|
| **Mw (Da)** | 3,800 | 6,000 | 6,000 | 37,000 | 462 | 435 |
| **% BZ content for end-cap resins** | 100 | 90 | 45 | | | |
| **Modulus (GPa)** | 2.2 ± 0.1 | 2.2 ± 0.1 | 2.3 ± 0.1 | 2.3 ± 0.1 | 3.1 ± 0.2 | 5.1 |
| **Tensile Strength (MPa)** | 57 ± 8 (max = 68) | 89 ± 7 (max = 97) | 89 ± 4 (max = 94) | 90 ± 3 (max = 95) | 72 ± 6 (max = 95) | 57 |
| **Elongation (%)** | 3.3 ± 0.6 (max = 4.2) | 7.5 ± 0.8 (max = 10.1) | 7.9 ± 0.7 (max = 9.0) | 7.1 ± 0.7 (max = 8.6) | 3.2 ± 0.4 (max = 3.6) | 1.2 |
| **DSC Tg (°C) (pre-cured resin)** | 120 | 142 | 155 | 190 | | |
| **Melt Viscosity of pre-cured resin (Pa.s)** | 10 (210 °C) | 490 (210 °C) | 2,050 (210 °C) | 8,500 (210 °C) | 0.40 (125 °C) | 0.60 (125 °C) |
| **DMA Tg (°C)** | 217 | 208 | 200 | 220 | 188 | 158 |
| **$Td_{5\%}$ (°C)** | 380 | 432 | 446 | 415 | 377 | 313 |

THERMOPLASTIC-THERMOSET HYBRID RESINS, METHODS, AND USES THEREOF

BACKGROUND

Thermosets and thermoplastics are distinct classes of polymers, distinguished from each other based on their behavior in the presence of heat. Specifically, thermoplastics such as polyethylene (PE), polycarbonate (PC), and polyetheretherketone (PEEK) become pliable or moldable upon application of heat (solidifying upon cooling), whereas thermosets such as epoxy, benzoxazine, and bismaleimide are irreversibly hardened upon curing, and cannot be melted or reshaped on heating. Thus, thermoplastic materials have melt temperatures (melting point) where they start to flow, while thermoset products can withstand higher temperatures without loss of their structural integrity once cured.

Thermoplastics are generally classified into three groups based on their mechanical and/or thermal properties. First are commodity plastics represented by PE, polyvinyl chloride (PVC), polystyrene (PS), and so on, which are widely used for applications such as packaging materials, food containers, and household products. Second are engineering plastics represented by PC, polyamide (PA), polyoxymethylene, and so on, which generally show better thermal and mechanical properties than commodity plastics, e.g., greater than 50 MPa of tensile strength and greater than 2.5 GPa of flexural modulus at temperatures above 100° C. Third are super engineering plastics represented by PEEK, polyetherimide and polyphenylene, which can be continuously used at temperatures above 150° C. They exhibit outstanding mechanical and thermal properties arising from rigid polymer backbone-based aromatic rings and stable second-order structures. While commodity thermoplastics have high processing efficiency in manufacturing, the super engineering plastics generally have difficulty in being molded, and require extremely high process temperatures (>300° C.) to exhibit good flow above their melting points.

Thermoset plastics generally show high modulus and superior creep resistance in comparison to thermoplastics due to their three-dimensional network of bonds achieved upon crosslinking (curing). This results in their elongation-at-break values being lower than thermoplastics. They also generally require long periods of cure time at temperatures ranging as high as 250° C.

Polymer alloys (blended polymers) composed of a blend of both thermoplastic compositions and thermoset compositions can provide desirable characteristics of both polymer types while mitigating less desirable features. Optimally, thermoplastic polymer chains can penetrate into the network structure of the cured thermoset component to form homogeneous semi-interpenetrated structures. However, there may be poor miscibility of thermoplastic components with thermoset components due to the phase separation, and it has proven difficult to combine these two materials to form stable polymer alloys with better thermal and/or mechanical properties.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a hybrid thermoplastic-thermosettable resin composition that includes a polymeric backbone formed from a thermoplastic unit, and at least one crosslinkable group bonded to the thermoplastic.

In another aspect, embodiments disclosed herein relate to a method of forming a hybrid thermoplastic-thermosettable resin composition that includes reacting a thermoplastic to introduce a cross-linkable group to form the thermoplastic-thermosettable resin composition.

In yet another aspect, embodiments disclosed herein relate to a method of forming a hybrid thermoplastic-thermoset resin that includes providing a hybrid thermoplastic-thermosettable resin composition comprising a polymeric backbone formed from a thermoplastic unit, and at least one crosslinkable group bonded to the thermoplastic; and curing the hybrid thermoplastic-thermosettable resin composition by an external stimulus to form the hybrid thermoplastic-thermoset resin.

Other aspects and advantages of the claimed subject matter will be apparent from the following description and the appended claims.

BRIEF DESCRIPTION OF DRAWINGS

FIG. 8 displays tensile properties measured from molded thin films.

DETAILED DESCRIPTION

Figure 1:
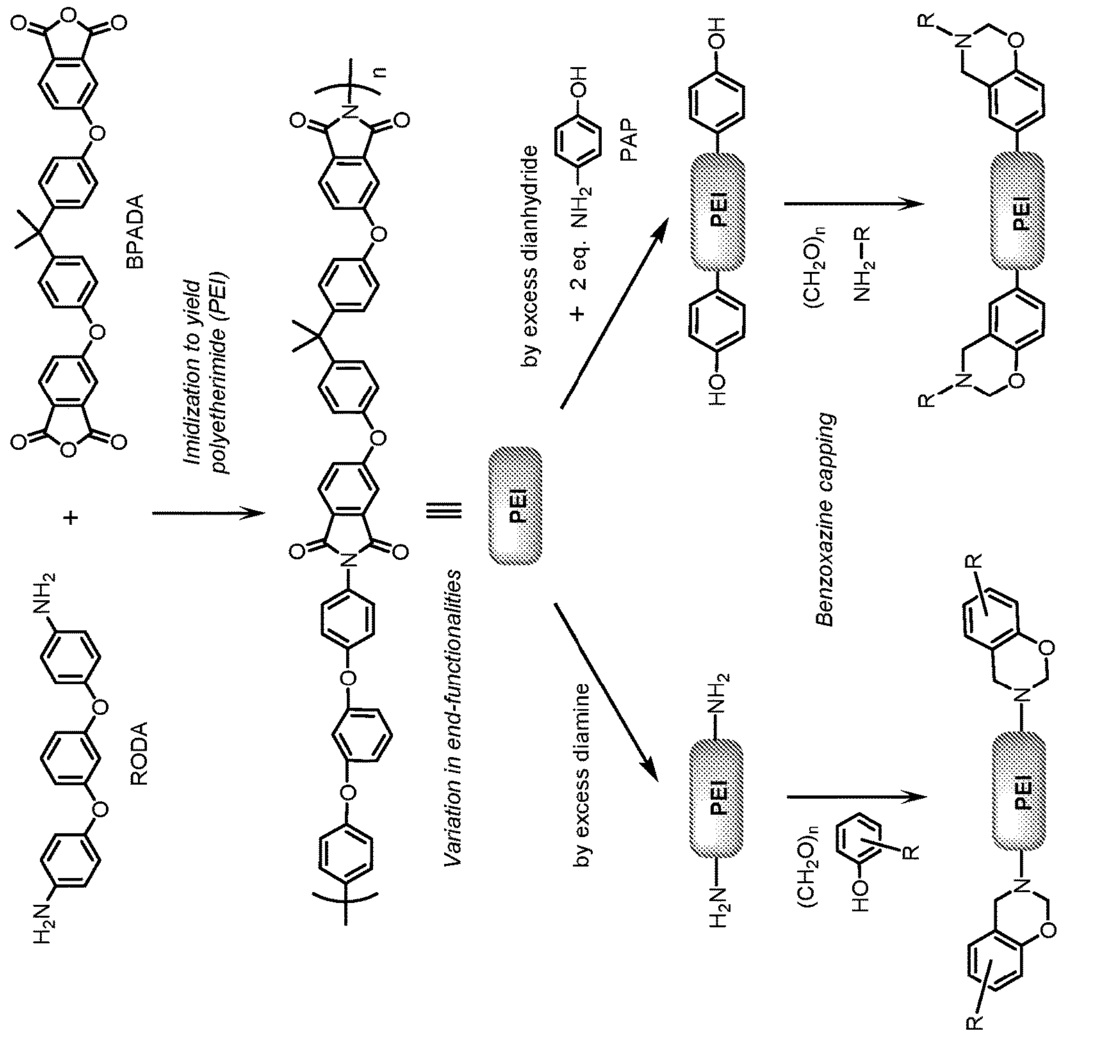
FIGS. 1 to 3 show reaction schemes for the formation of benzoxazine-thermoplastic resins in accordance with embodiments of the present disclosure.

Embodiments disclosed herein are generally directed to hybrid resins, specifically, thermoplastic resins with cross-linkable and/or curable groups activated by external stimuli selected from heat, ultraviolet irradiation, microwave irradiation, moisture, and so on. In one or more embodiments, a thermoplastic polymer may form at least a portion of the polymer backbone, which may have a cross-linkable group, either as a single end-cap or double end-caps or monomer units with cross-linkable groups within the thermoplastic backbone. The hybrid resins of the present disclosure may provide a combination of properties that thermosets and thermoplastics alone cannot achieve. For example, the cross-linkable groups in the hybrid resin may form a cross-linked structure by polymerization at elevated temperatures; however, prior to such cross-linking, the properties of the hybrid resin may largely reflect the thermoplastic component (and can be melted/molded and remelted/remolded). Advantageously, in one or more embodiments it was found that the melt-processing temperature for molding the hybrid resin may be lower than the melt-processing temperature of the thermoplastic alone, and also less than the curing temperature for the thermoset. Thus, the hybrid resin may possess a temperature range in which it may be molded prior to reaching the elevated cross-linking temperature or being activated by an external stimulus, at which point the cross-linking of the thermoset unit may be triggered. Further, the inclusion of a thermoplastic backbone may allow the cross-linked article to have one or more properties between that of a thermoplastic and a thermoset and unattainable with either alone. For example, while a thermoplastic will conventionally soften or re-melt upon exposure to temperatures above the melt-processing temperatures for the given thermoplastic, making such polymer unsuitable for articles in high temperature applications, the hybrid thermoplastic-thermoset resins may be cross-linked upon forming the article, thus preventing the softening or re-melting that would conventionally occur for thermoplastics.

As mentioned above, the hybrid resins of the present disclosure may include a thermoplastic polymer to form at least a portion of the polymer backbone. As used herein, by forming at least a portion of the backbone, there are repeating units of the monomer(s) that in a chain form a thermoplastic polymer (TP). In one or more embodiments, cross-linkable group(s) may form a single endcap or double endcaps on the thermoplastic. However, the thermoplastic forms at least a portion of the backbone because, in one or more embodiments, a cross-linkable group may bridge thermoplastic chains (TP) together.

In one or more embodiments, the hybrid resin may have a weight average molecular weight ranging from 500 to 400,000. In one or more embodiments, the hybrid resin may have cross-linkable end-caps, and the Mw of the TP units may range from 500 to 20,000. In one or more embodiments, the hybrid resin may have TP units bridged by a cross-linkable group where the TP units may have a Mw ranging from 500 to 20,000 and n may range from 1 to 20. Selection between hybrid resins may depend, for example, on the desired resin's rheological behavior, its extent of crosslinking upon curing, and the resulting tensile, mechanical and thermal properties.

Thermoplastic

Selection of the thermoplastic may depend on the desired properties for the thermoplastic (and end application) and may be selected, for example, from polyimides (PI), polyetherimides (PEI), polyaryl ether ketones (PAEK), polyphenylene sulfide (PPS), polysulfones (PSU), and polyamide-imides (PAI). PAEKs may include, for example, polyether ether ketone (PEEK) and polyether ketone ketone (PEKK). PSUs may include, for example, poly(arylene sulfone) (PAS), polyether sulfone (PES), and polyphenylene sulfone (PPSU). Further, while the above list of thermoplastics may be considered high performance thermoplastics, it is also envisioned that other thermoplastics may be selected for applications such as coatings, adhesives, etc. For example, in such embodiments, the thermoplastic backbone may be a polyether, polyethylene, polyamide, polyester, polysiloxane, polyacrylate, or polystyrene.

In one or more embodiments, the thermoplastic resin may have, or be modified to have, amine or phenolic end functionalities. As described below, the amine or phenolic end-functionalities may be reacted with formaldehyde and an amine or phenol (depending on the end-functionality of the thermoplastic so that the other is added with formaldehyde), to form benzoxazine groups attached to the thermoplastic resin.

In one or more particular embodiments, the thermoplastic backbone may be a polyimide backbone. Polyimide compositions in accordance with the present disclosure are prepared from a reaction of a diamine and dianhydride, under standard polymerization conditions. In some embodiments, two or more diamines may be used for copolymerization. In some embodiments, two or more dianhydrides may be used for copolymerization. In some embodiments, polyimide polymerization may occur by the following processes, but not limited to, reaction in the presence of one or more polar solvents (or co-solvents) such as gamma-butyrolactone, dimethylformamide or dimethylacetamide, and melt state reaction using an extruder, oven, hot press or autoclave. For example, polyimide polymerization may be performed under inert atmosphere, such as argon or nitrogen gas. In some embodiments, a solution of a polyamic acid polymer can be obtained by dissolving or diffusing at least one kind of diamine component and a dianhydride in a polar solvent. In some embodiments, a solution of a polyamic acid polymer can be obtained by dissolving or diffusing at least one kind of diamine component and a dianhydride diester in a polar solvent. During the reaction process between diamine and dianhydride, or between diamine and dianhydride diester, the reaction first produces a polyamic acid intermediate compound, which may then undergo ring closure to expel water or an alcohol and generate the corresponding polyimide. During or after the polyimide reaction, the reaction solvent may or may not be removed for further reaction to introduce a cross-linking group into the corresponding polyimide structure.

While the polyimide-forming reaction reacts according to the ratio of about 1:1 diamine:dianhydride, it is also envisioned that the ratio may be outside of this ratio depending on the intended application. Further, in particular embodiments, the diamine may be present in a greater amount than the dianhydride, resulting in terminal amine groups on the formed polyimide. In one or more embodiments, by virtue of the reaction between the diamine and the dianhydride, there are at least two imide groups formed by imidization, and such imidization occurs prior to the formation of a benzoxazine group (and subsequent ring opening of the benzoxazine groups).

In one or more embodiments, dianhydrides may include aromatic tetracarboxylic acid dianhydrides having a carbon number of 6 to 18 such as pyromellitic dianhydride (PMDA), 4,4'-bisphenol A dianhydride (BPADA), biphenyl-3,4,3',4'-tetracarboxylic dianhydride (BPDA), 2,2' bis(4-hydroxyphenyl) propanedibenzoate-3,3',4,4'-tetracarboxylic acid dianhydride (ESDA), 1,2 bis(trimellitate)ethane dianhydride (TMEG). Other dianhydrides may include oxydiphthalic dianhydride (ODPA), benzophenone-3,4,3',4'-tetracarboxylic dianhydride (BTDA), diphenylsulfone-3,4,3',4-tetracarboxylic dianhydride (DSDA), 4,4'-(2,2-hexafluoroisopropylidene)bis(phthalic anhydride) (6FDA) and m(p)-terphenyl-3,4,3',4'-tetracarboxylic dianhydride; and alicyclic tetracarboxylic dianhydrides having a carbon number of 4 to 6 such as cyclobutane-1,2,3,4-tetracarboxylic dianhydride and 1-carboxymethyl-2,3,5-cyclopentanetricarboxylic-2,6:3,5-dianhydride. Other embodiments may utilize dianhydride comonomers that incorporate "soft" alkyl backbones, such as formula (I), where $R^4$ is $CH_2$ and n is an integer ranging from 1 to 5:

(I)

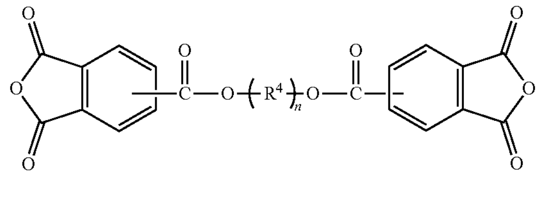

Diamines in accordance with the present disclosure may include aromatic diamine compounds having a carbon number of 6 to 27 such as bis[4-(3-aminophenoxy)phenyl] sulfone (BAPS-m), bis[4-(4-aminophenoxy)phenyl]sulfone (BAPS-p), 1,4-diaminobenzene (PPD), 1,3-diaminobenzene (MPD), 2,4-diaminotoluene (2,4-TDA), 4,4'-diaminodiphenylmethane (MDA), 4,4'-diaminodiphenylether (ODA), 3,4'-diaminodiphenylether (DPE), 3,3'-dimethyl-4,4'-diaminobiphenyl (TB), 2,2'-dimethyl-4,4'-diaminobiphenyl (m-TB), 2,2'-bis(trifluoromethyl)-4,4'-diaminobiphenyl (TFMB), 3,7-diamino-dimethyldibenzothiophen-5,5-dioxide (TSN), 4,4'-diaminobenzophenone, 3,3'-diaminobenzophenone, 4,4'-bis(4-aminophenyl) sulfide (ASD), 4,4'-diaminodiphenyl sulfone (ASN), 4,4'-diaminobenzanilide (DABA), 1, n-bis(4-aminophenoxy)alkane (n=3, 4 or 5, DAnMG), 1,3-bis(4-aminophenoxy)-2,2-dimethylpropane (DANPG), 1,2-bis[2-(4-aminophenoxy)ethoxy]ethane (DA3EG), 1,5-bis(4-aminophenoxy) pentane (DASMG), 1,3-bis(4-aminophenoxy) propane (DA3MG), 9,9-bis(4-aminophenyl)fluorene (FDA), 5(6)-amino-1-(4-aminomethyl)-1,3,3-trimethylindan, 1,4-bis(4-aminophenoxy)benzene (TPE-Q or APB-144), 1,3-bis(4-aminophenoxy) benzene (TPE-R or APB-134 or RODA), 1,3-bis(3-aminophenoxy)benzene (APB or APB-133)), 4,4'-bis(4-aminophenoxy) biphenyl (BAPB), 4,4'-bis(3-aminophenoxy)biphenyl, 2,2-bis(4-aminophenoxyphenyl) propane (BAPP), 2,2-bis[4-(4-aminophenoxy)phenyl] hexafluoropropane (HFBAPP), 3,3'-dicarboxy-4,4'-diaminodiphenylmethane (MBAA), 4,6-dihydroxy-1,3-phenylenediamine (known as 4,6-diaminoresorcin), 3,3'-dihydroxy-4,4'-diaminobiphenyl (HAB) and 3,3',4,4'-tetraminobiphenyl (TAB); aliphatic or alicyclic diamine compounds having a carbon number of 6 to 24 such as 1,6-hexamethylenediamine (HMD), 1,8-octamethylenediamine (OMDA), 1,9-nonamethylene diamine, 1,12-dodecamethylene diamine (DMDA), 1-amino-3-aminomethyl-3,5,5-trimethylcyclohexane, 4,4'-dicyclohexylmethanediamine and cyclohexanediamine; and silicone based diamine compounds such as 1,3-bis(3-aminopropyl)-1,1,3,3-tetramethyldisiloxane and polydimethyl siloxane (PDMS). Other embodiments may use one or more flexible comonomers that include: aromatic diamines (II) or (III), wherein each $R^3$ is independently selected from H, $CH_3$, or halogen, and n is an integer in the range of 1 to 7, and alkyl diamines such as hexamethylene diamine (IV):

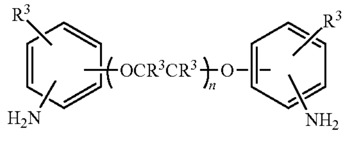
(II)

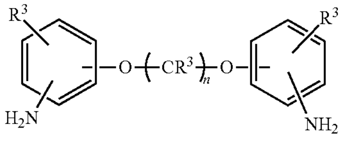
(III)

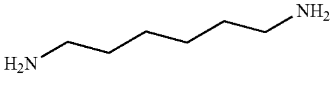
(IV)

The selection of diamines and dianhydrides, as well as the size of the polyimide (as the thermoplastic unit having molecular weight ranges described above) and degree of imidization, may be made depending on the desired characteristics of the thermoplastic component, including for example thermal and physical properties. In one or more embodiments, the degree of imidization may be at least 90, 95, or 99%; however, it is also understood that lower degrees of imidization may be used without departing from the scope of the present disclosure. For example, in a particular embodiment, the polyimide backbone may be formed from BPADA and RODA or BAPP and BPADA to provide for multiple ether groups in the backbone, allowing the hybrid resin to have good melt flow at lower temperatures (<250° C.). Further, the melt viscosity may be increased or decreased by varying the length of the backbone.

Cross-Linkable Groups

The hybrid resins involve cross-linkable groups, as a single endcap or double endcaps, as part of the polymer backbone, or as pendant groups arising off of the polymer backbone. In some embodiments, these cross-linkable groups can be introduced into a polymer structure by a reaction between functional groups of a resin and a compound having a cross-linking group. In some embodiments, the compound having cross-linkable groups can be used as one of the monomers when a resin is synthesized. Methods of introducing cross-linkable groups may include, but are not limited to, solvent-based reactions, and melt state reactions such as by way of using an extruder, oven, hot press, or autoclave. In some embodiments, these cross-linkable groups can be reacted with each other to form a polymerized structure by external stimuli selected from heat, ultraviolet irradiation, microwave irradiation, moisture, and so on. In some embodiments, these external stimuli may be independently used for curing these cross-linkable thermoplastic resins. In some embodiments, two or more stimuli may be used for curing these cross-linkable thermoplastic resins at the same time. In some embodiments, two or more external stimuli may be used at separate times for making partially cured (pre-cured) intermediates of cross-linkable thermoplastic resins, followed by full curing. In some embodiments, compounds capable of reacting by external stimuli may be used for curing along with cross-linkable thermoplastic resins to be cross-linked together. For example, the cross-linkable groups activated by heat may include, but are not limited to, epoxy, benzoxazine, nitrile, bismaleimide, citraconic imide, and other unsaturated hydrocarbon groups such as nadic imide, phenylethynyl, phenylethynyl imide, and so on. The cross-linkable groups by ultraviolet may include, but are not limited to, acrylic, methacrylic, cinnamic, allyl azide, and other unsaturated hydrocarbon groups. In some embodiments, these cross-linkable groups can be used independently. In other embodiments, two or more cross-linkable groups can be used together. Also, for example, the cross-linkable groups by microwave irradiation may include, but are not limited to, epoxy and other unsaturated hydrocarbon groups. These cross-linkable groups may be used independently or together. The cross-linkable groups by moisture absorption may include, but are not limited to, cyanoacrylate, isocyanate, and alkoxysilanes. These cross-linkable groups may be used with catalysts for accelerating the cure reaction.

In one or more embodiments, the hybrid resins may have a benzoxazine cross-linkable group therein, as shown in formula (V) to (VIII) below. In contrast to poly(benzoxazines), which undergo ring-opening polymerization of a benzoxazine monomer, the benzoxazine structural unit (ring structure) is formed as an end-cap or monomer unit in the hybrid resin of the present disclosure. Specifically, the benzoxazine cross-linkable group may, following the formation of the hybrid resin shown in formula (V) to (VIII), undergo ring-opening to cross-link polymer backbones of the hybrid resin.

(V)

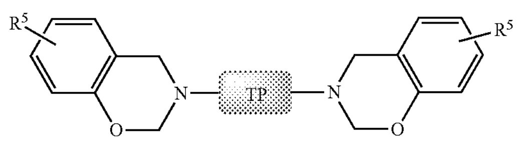

(VI)

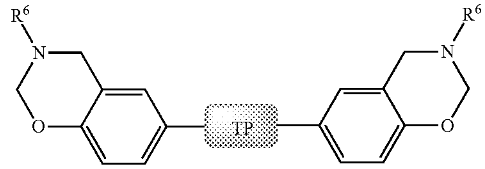

(VII)

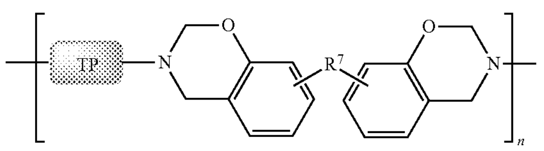

(VIII)

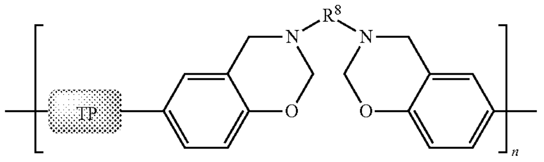

In order to form the benzoxazine (BZ) cross-linkable units shown in formula (V) to (VIII), a thermoplastic polymer having an amine or phenol end-functionality may be reacted with formaldehyde and the other of an amine or phenol (depending on the end functionality of the thermoplastic). If a BZ-end cap is desired (as shown in formula (V) and (VI) above), the amine or phenol reactant may be monofunctional, whereas if a —(TP-BZ)$_n$— macromolecular unit is desired (as shown in formula (VII) and (VIII)), the amine or phenol reactant may be difunctional (i.e. a diamine or diphenol). As may be appreciated, the amines (whether monoamines or diamines) may be primary amines so as to form the BZ ring.

In formula V, $R^5$ may represent one or more of a hydrogen atom, a hydrocarbon group, a substituted hydrocarbon group, and a functional group. The hydrocarbon group may be branched, straight chain, and/or ring-containing structures, and the hydrocarbon groups may be saturated or unsaturated. The hydrocarbon groups may be primary, secondary, and/or tertiary hydrocarbons. The term "substituted hydrocarbon group" may refer to a hydrocarbon group (as defined above) where at least one hydrogen atom is replaced with a non-hydrogen group, resulting in a stable compound. Such substituents may be groups selected from, but are not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, and heterocyclyl, and mixtures thereof. The functional groups may be groups selected from, but are not limited to, halo, hydroxyl, alkoxy, oxo, amino, amido, thiol, alkylthio, sulfonyl, alkylsulfonyl, sulfonamide, substituted sulfonamide, nitro, cyano, carboxy, carbamyl, or alkoxycarbonyl groups, and the like. Formula V is formed from reacting a phenol (optionally substituted including with any of the aforementioned groups) with a primary amine-terminated TP unit. For example, in one or more particular embodiments, the $R^5$ may represent a methyl, methoxy, allyl, or naphthol substituent on the phenol group reacting with the amine.

In formula VI, $R^6$ may represent any of the groups mentioned with regard to $R^5$. However, in particular embodiments where thermal stability is desired for the particular application, $R^6$ may be an aryl group, including substituted aryl groups such as optionally substituted phenyl, naphthyl, xylyl, or thienyl groups. For example, in one or more embodiments, $R^6$ may be formed from reaction of aniline, substituted anilines (such as toluidines, methoxyaniline), naphthylamines, etc. However, in other lower temperature applications, $R^6$ may be an alkyl or silyl group, resulting from reaction of alkyl or silyl amines such as methyl amines, isopropyl amines, allyl amine, or aminosilane.

In formula VII, $R^7$ may represent a hydrocarbon group or a substituted hydrocarbon group, as defined above with regard to $R^5$, and which is formed from a bisphenol. The bisphenol of one or more embodiments may be one or more of the group consisting of bisphenol A, bisphenol B, bisphenol C, bisphenol E, bisphenol AF, bisphenol AP, bisphenol Z, bisphenol S, bisphenol M, and substituted derivatives thereof.

In formula VIII, $R^8$ may be a hydrocarbon group or a substituted hydrocarbon group, as defined above with regard to $R^5$, and which is formed from a diamine, including but not limited to those described above in forming a polyetherimide, such as aromatic diamines, silicone-based diamines, alkyl diamines, and polyetheramines. In particular embodiments, $R^8$ may represent an aromatic group such as, but not limited to, benzene, bibenzyl, diphenylmethane, naphthalene, anthracene, diphenyl ether, stilbene, phenanthrene, fluorine, and substituted variants thereof.

Figure 2:
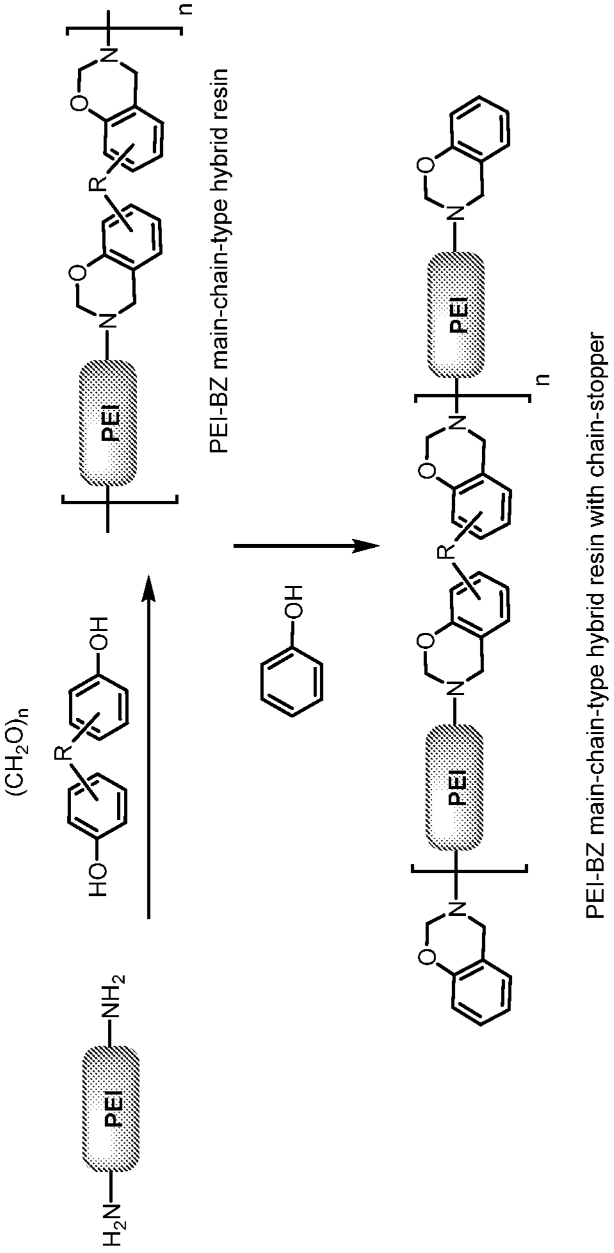
Figure 3:
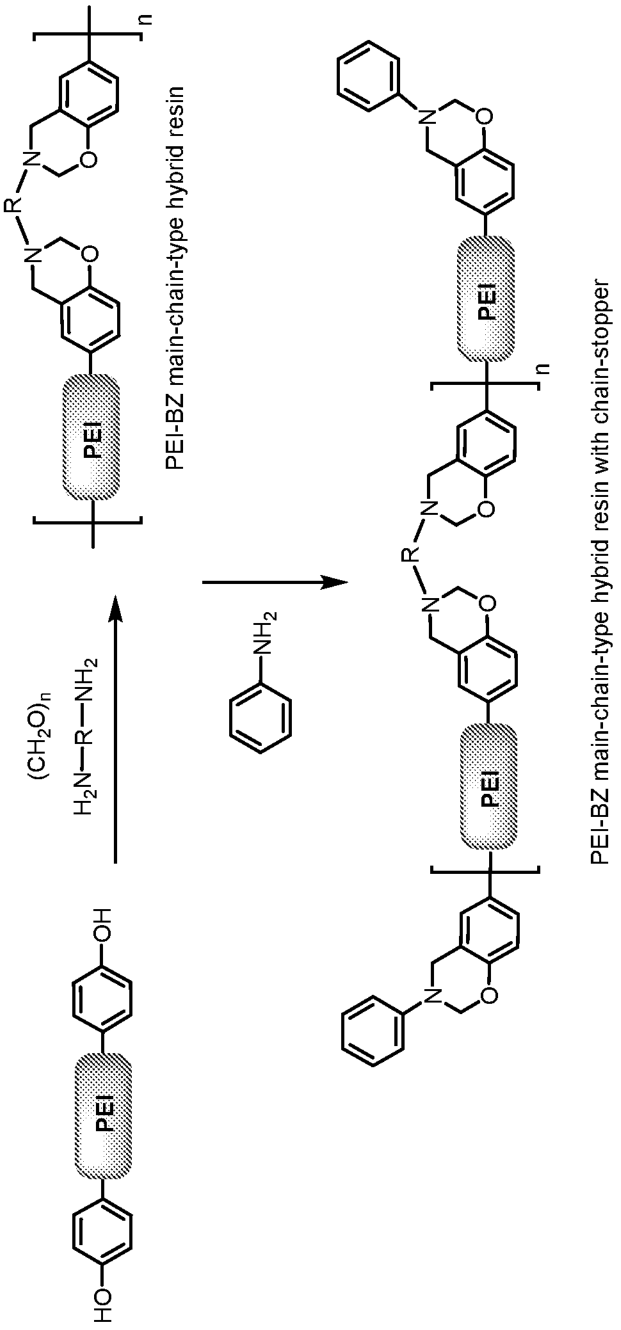

An example reaction scheme leading to formula (V) and (VI) is shown in FIG. 1, an example reaction scheme leading to formula (VII) is shown in FIG. 2, and an example reaction scheme leading to formula (VIII) is shown in FIG. 3. FIG. 1 shows the reaction of a diamine and dianhydride (specifically RODA and BPADA) by polyimidization to result in a polyetherimide (PEI). The PEI could be prepared with amine (PEI-$NH_2$) or phenol end-functionalities (PEI-OH). The PEI-$NH_2$ polyimide is then reacted with paraformaldehyde and a phenol to result in a polyetherimide-benzoxazine (PEI-BZ) hybrid resin where the BZ units are specifically in the form of end-caps to the PEI chain. This PEI-BZ could be similarly obtained by the reaction of PEI-OH with paraformaldehyde and a primary amine as shown. Referring now to FIG. 2, using the same PEI-$NH_2$ polyimide as an example, the PEI-$NH_2$ is reacted with a diphenol in the presence of paraformaldehyde to form a PEI-BZ main-chain hybrid resin. Further, as shown, a monofunctional phenol (or amine) may be introduced as a chain-limiter to control the molecular weight of the resulting hybrid resin having BZ-bridged PEI units in the main-chain or backbone of the hybrid resin. Referring now to FIG. 3, polyimide having phenol end functionalities (PEI-OH) is reacted with a diamine in the presence of paraformaldehyde to form a PEI-BZ main-chain hybrid resin according to formula (VIII). The resulting resin may be reacted with a monofunctional amine or phenol as a chain limiter.

In some embodiments, benzoxazine formation may occur by the following methods, but are not limited to, reaction in one or more solvents (or co-solvents), melt state reaction using an extruder, oven, hot press or autoclave. In some embodiments, benzoxazine formation may occur at a temperature ranging from 50 to 150° C. over a period of 1-200 hours. For example, reaction solvents may be selected from N-methyl-2-pyrrolidone, dimethylformamide, chloroform, 1-4-dioxane, toluene, ethyl acetate, ethanol and 2-methoxyethanol. In particular embodiments, a combination of 1,4-dioxane and 2-methoxyethanol may provide a good homogeneous reaction phase and minimize formation of unwanted side-products such as triazine while maintaining high reaction temperatures. In one or more embodiments, without isolating PEI-OH after the polyimide reaction in a given solvent, the subsequent benzoxazine formation may be continuously performed in the polyimide solution by adding another solvent.

In one or more embodiments, the percent conversion of amine or phenol end-functionalities to benzoxazine for the end-capped PEI-BZ hybrid resins can be varied. The BZ conversion may range from 25 to 100% and may depend on, for example, the desired cross-linking density, post-cure Tg, or the pre-cure melt-behavior of the final hybrid resin.

Upon formation of a hybrid TP-BZ resin, the benzoxazine may be cured (cross-linked) in a variety of manners, including but not limited to a cure cycle, solution casting, hot-melt pressing, etc. The cure mechanism may be selected depending on the type of article and the way in which the hybrid resin is to be used, for example, as an impregnator (such as in composite fibers to form a pre-preg), composite, adhesive, coating, etc. For example, prior to curing, the hybrid resin may be raised above a pre-cure Tg but below the cure temperature so that the hybrid resin may be melt-processed into its desired form and then cured to crosslink and solidify the resin.

In one or more embodiments, the curing may be triggered by an external stimulus such as UV and/or microwave treatment. Thus, embodiments of the present disclosure also relate to thermoplastic resin compositions that include curable groups that may be crosslinked via an external stimulus such as UV and/or microwave treatment.

In one or more embodiments, the thermoplastic resin composition may include a functional group that can be cured (crosslinked) via UV and/or microwave treatment, referred to herein as "a curable functional group." Suitable curable functional groups include functionality that is microwave- and/or UV-curable, meaning, upon exposure to UV and/or microwave radiation, crosslinking is triggered in the thermoplastic resin. In the case of microwave radiation, curable functional groups may absorb the radiation to trigger crosslinking For example, for a compound to be microwave-curable, it may include polar functionality. Thus, such functionality may absorb the radiation, and convert the radiation into heat to trigger curing of the thermoplastic resin composition. In the case of UV radiation, a photoinitiator may absorb UV radiation and generate radicals and/or ions that attack a curable functional group, which triggers crosslinking In order for a compound to be UV curable, it may include functional groups that are capable of being attacked by radicals and/or ions generated by one or more photoinitiators, and form covalent bonds with other functional groups. In one or more embodiments, the curing may involve reaction of other functional groups present in the thermoplastic resin composition (including but not limited to benzoxazine rings that may ring-open in curing) triggered by the heat generated by the curable functional group or by radicals and/or ions generated by photoinitiators.

In one or more embodiments, the curable functional group is a polar group suitable for absorbing microwave radiation. Examples of types of suitable polar functional groups may include, but are not limited to, carboxylic acids, amides, alcohols, esters, aldehydes, and ketones.

In one or more embodiments, the curable functional group is "UV-sensitive," meaning it is a functional group that is capable of being attacked by radicals and/or ions generated by one or more photoinitiators. Such functional groups may then form covalent bonds with other functional groups (crosslinking) Examples of types of UV sensitive functional groups may include, but are not limited to, functional groups having an activated double bond, such as acrylic, methacrylic, styrene, and vinylpyrrolidone groups.

In one or more embodiments, the curable functional group may be bound to the thermoplastic polymer, which may occur by modification of the thermoplastic polymer by a curing component having such curable functional group or by polymerizing monomers having such curable functional group, i.e., through synthesis of the polymer. In such embodiments, the curable functional group is an internal component, i.e., is covalently bonded to the polymer. Further, it is also envisioned that the polymer may be combined with an external curing component that does not react with the polymer until triggered by the microwave or UV cure.

Thus, in one or more other embodiments, the curing component (prior to reaction with a polymer) may include multiple functionalities, including the curable functional group and at least one functionality that is reactive such that it may bond to a thermoplastic polymer. In such embodiments, the curing component (prior to reaction with a polymer) may function as a raw material to form a polymer having an internal curable functional group. Thus, in addition to polar and/or UV sensitive functionality, the curing component may also include at least one reactive functionality that bonds to the thermoplastic resin composition. Moreover, in addition to the functionality that binds to the polymer prior to the microwave- and/or UV-triggered cure, the curing component may also optionally include at least one additional reactive functional group that is reactive upon the microwave- and/or UV-triggered cure. That is, in one or more embodiments that include at least one additional reactive functional group, the curing component functioning as a raw material (prior to being bound to the polymer, or a monomer in the case of the curable functional group being incorporated by a polymer synthesis mechanism) may have at least two reactive groups, such that upon a first reaction with the polymer or monomer, at least one reactive group remains in the curable functional group. Further, while the curable functional group may include one of such additional reactive functional groups, it is also envisioned that the curable functional group may include at least two of such additional reactive functional groups so that such additional reactive functional groups may result in additional crosslinking.

In one or more embodiments, the reactive functionality is such that it may bond to a thermoplastic polymer and/or undergo crosslinking Examples of types of functional groups suitable for use as the reactive functionality may include, but are not limited to, phenols, amines, thiols, ethers, esters, acrylates, oxiranes, carbamates, phosphorylates, glycolipids, polyethoxylates, benzoxazines, and derivatives thereof.

Further, it is also understood that a functionality that absorbs microwave radiation or is UV sensitive may also be the reactive functional group, such that upon triggering by the radiation, the group crosslinks the polymer.

It is also envisioned that the radiation may trigger a combination of reactions involving the curable functional group itself as well as the other functional groups that do not absorb and convert the radiation into heat.

However, as mentioned above, if the curing component does not include two reactive functionalities (and the curable functional group bound to the polymer does not also include at least one reactive functionality), the polymer may still crosslink by including other reactive groups, such as reactive end-caps, whose reaction may be triggered by the heat generated from the microwave or by radicals and/or ions emitted by the photoinitiator following UV radiation. In one or more embodiments, the polymer may include benzoxazine end-caps whose cure may be triggered by the UV or microwave radiation. Further, it is also contemplated that the resin composition may include both reactive end-caps as well as curable functional groups that also contain reactive functionality.

Examples of reactive functional groups may include, but are not limited to, epoxides, thiols, amines, and carboxylic acids. Examples of compounds that include such reactive functional groups, and thus may be the curing component, may include, but are not limited to, epichlorohydrin, celloxide 2021P (7-oxabicyclo[4.1.0]heptan-4-yl 2-(7-oxabicyclo [4.1.0]heptan-4-yl)acetate), YDF-170 (a diglycidylether bisphenol A epoxy oligomer), methacrylic anhydride, and 1,1,1-tris(4-hydroxyphenyl)ethane, 4,4'-oxydianiline.

Curable functional groups of the present disclosure may be incorporated into the thermoplastic resin composition using a variety of suitable strategies. In one or more embodiments, the curable functional group may be covalently bonded to the thermoplastic polymer, and as such the polymer includes an internal curable functional group. In other embodiments, the curable functional group is not covalently bonded to the thermoplastic polymer, but rather, is present in an external curing component mixed with the polymer, particularly curable by microwave radiation. In such embodiments, the polymer is not reacted with or bonded to the external curing component until curing is triggered by microwave or UV radiation. Moreover, it is also envisioned that a polymer with an internal curable functional group may be combined with an external curing component and cured.

As mentioned above, in embodiments in which the polymer has a curable functional group is covalently bonded to the thermoplastic polymer (i.e., an internal curable functional group), the curable group may be introduced by covalently bonding directly to the thermoplastic polymer, or by selecting at least one monomer that includes the curable functional group for use in a monomer mixture which is then polymerized to form a thermoplastic polymer.

In embodiments triggered by UV radiation, at least one photoinitiator is also generally present. A photoinitiator is a compound that may convert UV radiation into chemical energy in the form of radicals and/or ions. Types of photoinitiators may include, but are not limited to, benzoin ethers, benzyl ketals, α-dialkoxyacetophenones, α-hydroxyalkylphenones, α-amino alkylphenones, acylphosphine oxides, benzophenones/amines, thioxanthones/amines, and titanocenes.

Figure 4:
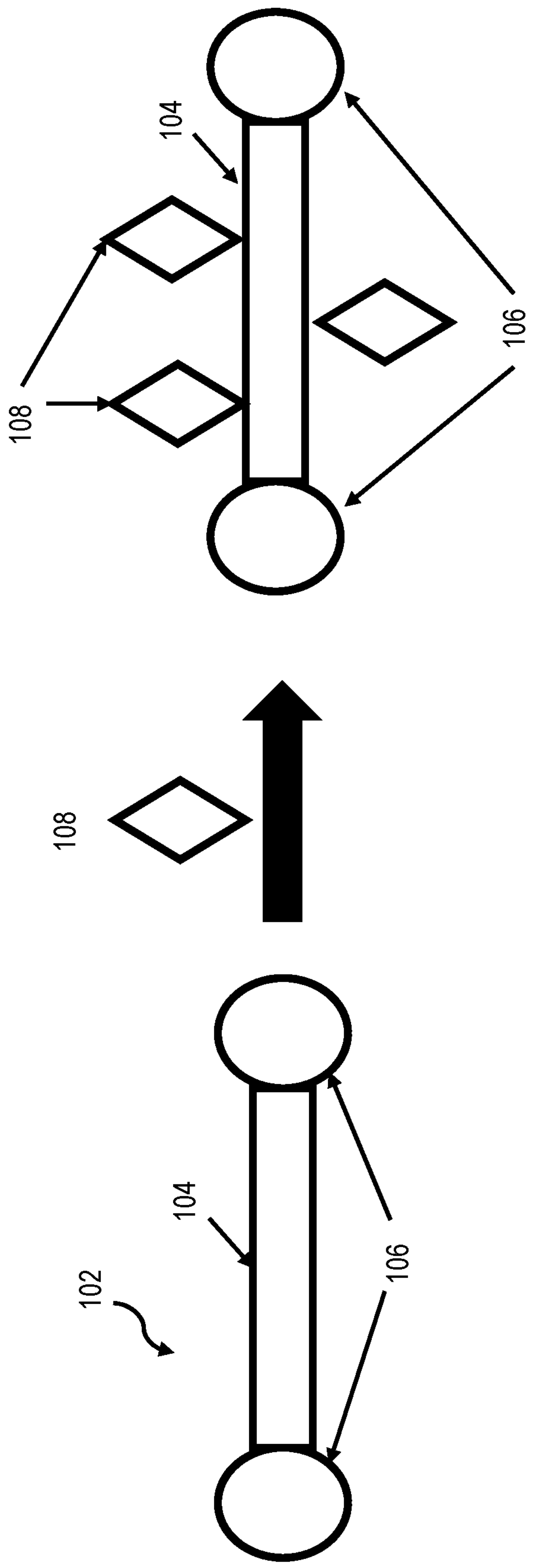
FIG. 4 is a schematic depiction of a polymer modification strategy in accordance with one or more embodiments of the present disclosure.

A schematic depiction of an embodiment of bonding the curable group to the polymer so that the polymer includes an internal curable functional group is shown in FIG. 4. In FIG. 4, a thermoplastic polymer 102 includes a polymer backbone 104 and optional end caps 106. The polymer is modified (indicated by the arrow) such that a curable functional group 108 is covalently bonded to the thermoplastic polymer 102 and the polymer thus includes an internal curable functional group. In the embodiment shown in FIG. 1, the curable functional groups 108 are covalently bonded to the polymer backbone 104. In some embodiments, the curable groups may be covalently bonded to the end caps. In some embodiments, curable groups may be covalently bonded to the polymer backbone and the end caps. As may be appreciated by those skilled in the art, the amount of internal curable groups bonded to the polymer may be adjusted to tune the amount of crosslinking in a cured polymer.

In one or more embodiments, a polyimide polymer may be utilized as the thermoplastic polymer to which a curable functional group may be bonded. In a polyimide system, the end caps may be modified to have curable functional groups. In one or more embodiments, a polyimide polymer having amine groups as end caps, as shown in structure (IV), may be modified to include a curable functional group.

(IX)

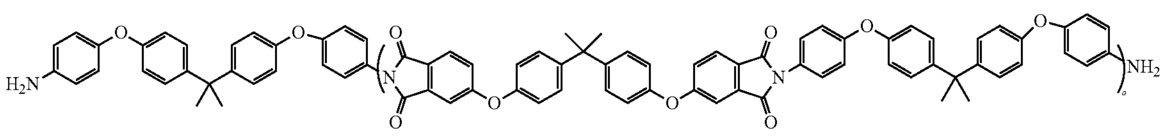

Structure (IX) may be modified with a curing component, such as, for example, methacrylic anhydride or epichlorohydrin, to form a polymer which includes an internal curable group, in accordance with one or more embodiments of the present disclosure. When the polyimide shown in structure (IX) is modified with methacrylic anhydride, methacrylic anhydride reacts with the amine-group end caps to form structure (X).

(X)

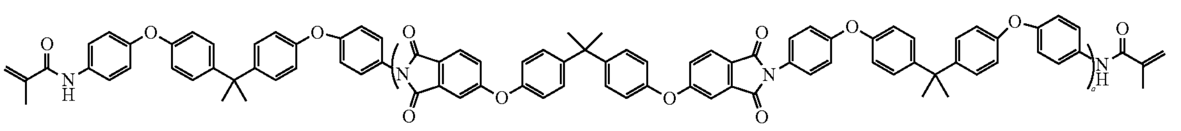

The polymer shown in structure (X) may be cured via UV treatment (in the presence of a photoinitiator) due to the presence of the curable functional groups, specifically UV-sensitive groups. As shown, these internal functional groups are covalently bonded to the end caps.

In one or more embodiments, a polyimide polymer having hydroxyl groups as end caps, as shown in structure (XI), may be modified to include an internal curable functional group.

(XI)

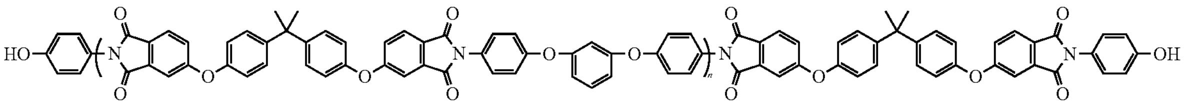

When the polymer in structure (XI) is modified with epichlorohydrin, epichlorohydrin reacts with the hydroxyl groups to form structure (XII).

(XII)

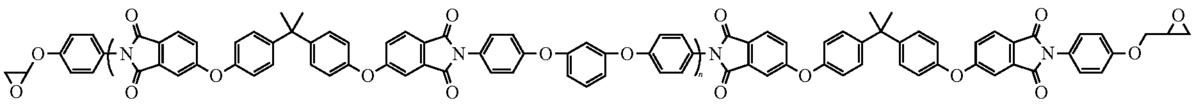

The polymer shown in structure (XII) may be cured via microwave treatment due to the presence of the polar curable functional groups. As shown, these internal functional groups are covalently bonded to the end caps.

Figure 5:
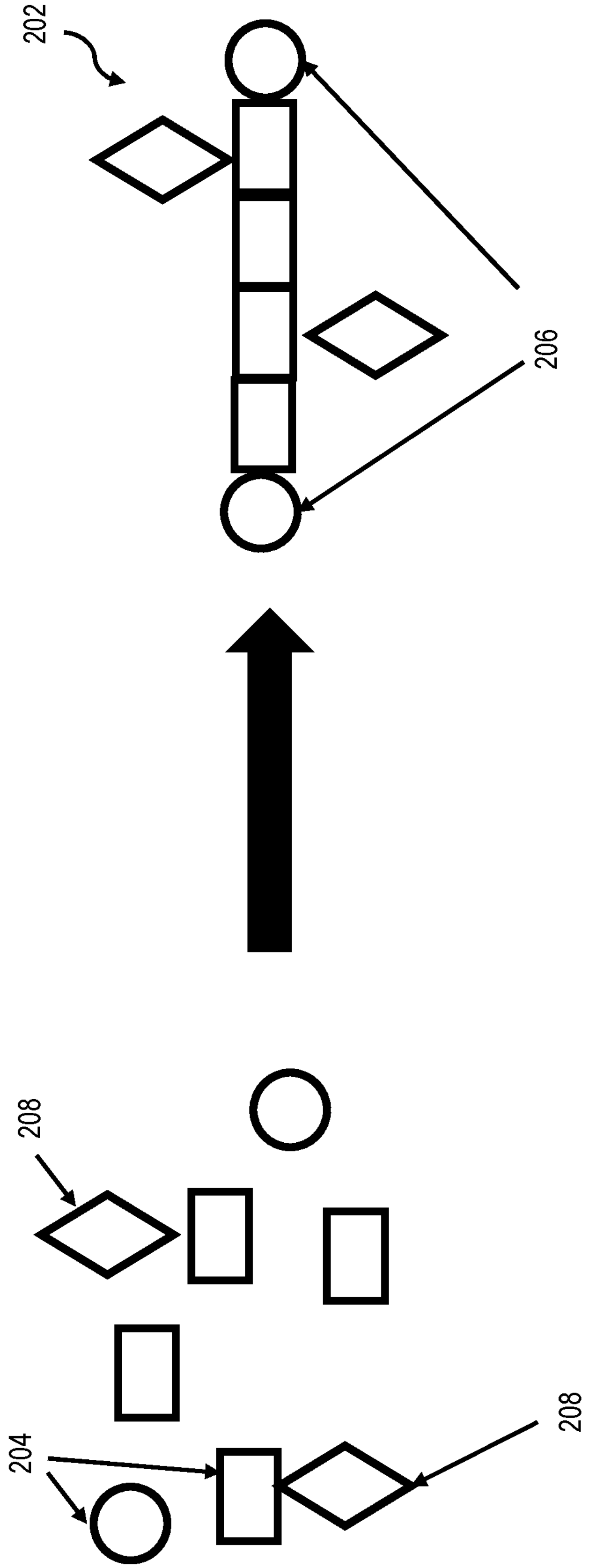
FIG. 5 is a schematic depiction of a polymer synthesis strategy in accordance with one or more embodiments of the present disclosure.

In one or more embodiments, the curable functional group may be incorporated into the thermoplastic resin composition by selecting at least one monomer that includes the curable functional group for use in a monomer mixture which is then polymerized to form a thermoplastic polymer. A schematic depiction of this strategy is shown in FIG. 5. In the embodiment shown in FIG. 5, some monomers 204 include curable groups 208. The resultant mixture is then polymerized (indicated by the arrow) to form a thermoplastic polymer 202 that includes the curable groups 208 as an internal curable functional group. The polymer 202 includes optional end caps 206, which are curable functional groups.

In one or more embodiments, the curable functional group may be present in the thermoplastic composition by blending an external curing component that includes the curable functional group with the thermoplastic resin composition. In such embodiments, the curable functional group is not covalently bonded to the thermoplastic polymer, but is present on the external curing component combined with the polymer. Instead, in some embodiments, the curable functional group in the external curing component absorbs microwave radiation, heating the polymer. In such cases, the curable groups may also contain reactive functional groups, and due to the heating generated by the microwave radiation, the thermoplastic polymer may also crosslink with the curable functional group to form a cured (crosslinked) polymer. In one or more embodiments, the curable group may be replaced by a polar and non-curable group. In such cases, the polar and non-curable group absorbs the microwave radiation, converts it to heat, and assists the curing of thermoplastic polymer. In some embodiments, a photoinitiator absorbs UV radiation and generates radicals and/or ions that attack the curable functional group present on the curing component, which covalently bonds with other functional groups in the polymer.

Figure 6B:
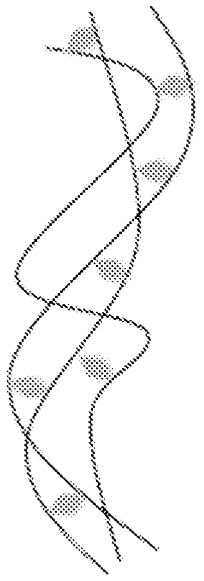
FIGS. 6A-6B is a schematic depiction of a polymer composition in accordance with one or more embodiments of the present disclosure.
Figure 6A:
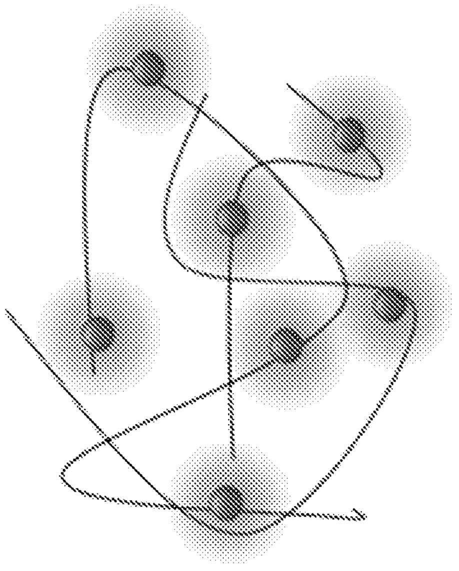

A schematic depiction of a crosslinkable thermoplastic polymer with curable groups covalently bonded to the polymer as internal curable groups is shown in FIG. 6A. The curable groups on the polymer are depicted as circles, and the thermoplastic polymer is a depicted as lines. A schematic depiction of a cured resin of the composition shown in FIG. 6A is shown in FIG. 6B.

Figure 7B:
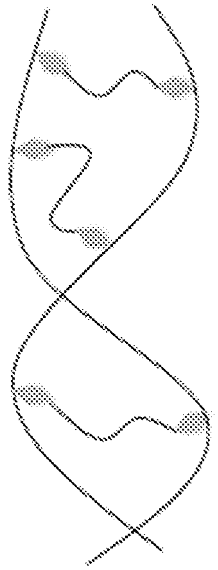
FIGS. 7A-7B is a schematic depiction of a polymer composition in accordance with one or more embodiments of the present disclosure.
Figure 7A:
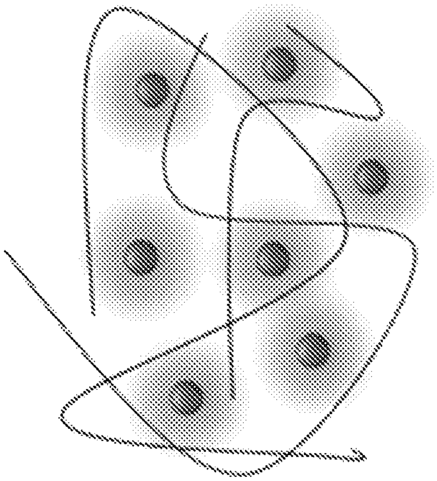

A schematic depiction of a crosslinkable thermoplastic polymer with external curable groups that are not covalently bonded to the polymer is shown in FIG. 7A. The curing components that include the curable groups are depicted as circles, and the thermoplastic polymer is a depicted as lines. A schematic depiction of a cured resin of the composition shown in FIG. 7A is shown in FIG. 7B.

The compositions of the present disclosure may be cured by microwave and/or UV-treatment. As may be appreciated by those skilled in the art, appropriate conditions for microwave and UV treatments may be selected based on the properties of the material to be cured, and based on the desired properties of the cured material.

The compositions disclosed herein may be cured via microwave treatment at a suitable time, frequency, and power. In one or more embodiments, a microwave treatment time may be in a range of from 1 minute to 60 minutes. The microwave treatment time may have a lower limit of one of 1 minute, 5 minutes, 10 minutes, 15 minutes, and 20 minutes, and an upper limit of one of 30 minutes, 45 minutes, 50 minutes, 55 minutes and 60 minutes, where any lower limit may be combined with any mathematically compatible upper limit. In one or more embodiments, a microwave treatment frequency may be in the range of from 0.3 to 300 GHz, and a microwave treatment power may be in a range of from 100 W to 100 kW.

The compositions disclosed herein may be cured via UV treatment at a suitable time, wavelength, and power. In one or more embodiments, a UV treatment time may be from 5 seconds to 2 hours. The UV treatment time may have a lower limit of 5 seconds 10 seconds, 30 seconds, 60 seconds, 90 seconds, and 5 minutes, and an upper limit of one of 10 minutes, 20 minutes, 30 minutes, 60 minutes, 90 minutes, and 120 minutes, where any lower limit may be paired with any mathematically compatible upper limit. In some embodiments, a UV treatment wavelength is less than 400 nm. In one or more embodiments, a UV treatment power may be in a range of from 10 W to 1 kW. Such treatments may result in a crosslinked structure as determined by the curable functional groups.

Compositions and methods disclosed herein may be particularly useful as compared to conventional thermal curing of resins because UV and microwave curing may require less curing time, less energy input for curing, and more flexibility in processing of the compositions. For example, microwave curing may enable free-standing post-curing strategies, and UV curing allows for greater ease in processing in surface coatings and UV patterning applications.

In one or more embodiments, the hybrid resin may be formulated with additives, tougheners made from thermoplastic resins, thermosetting resins, inorganic salts, organic compound, and so on. The formulation can be performed by a powder dry mixing, melt mixing, or mixing in solution. The shape of both the additives and the tougheners may involve a particle that may include, but is not limited to, a plate or a fiber, for example. One or more additives, tougheners, and fibers may be formulated together with the hybrid resin. For example, one or more thermoplastic resins can be formulated together with the hybrid resin. Such thermoplastic resin may include, but is not limited to, PEEK, PPS, PEI, PC, polysulfone, and so on. In another example, one or more thermosetting resins can be formulated together with the hybrid resin and thermally co-cured. Such thermosetting resin may include, but is not limited to, epoxy, benzoxazine, bismaleimide, cyanate ester, and so on. It is also envisioned that the thermoplastic and the thermosetting resins can be used together with the hybrid resin of the present disclosure. In one or more embodiments, inorganic salts, organic compounds, and a combination thereof may be used with the hybrid resin to lower the curing temperature. For example, the organic compound involves a functional group including, but not limited to, an amino group, imidazole group, carboxylic group, hydroxy group, sulfonyl group, and so on.

The shape of the hybrid resin may involve a powder that includes, but is not limited to, a film, chunk, fiber, and so on. The film, chunk, and/or fiber can be made by thermal treatment of the powder of the hybrid resin or its solution using a press molding or casting method. The molded articles can be thermally remolded to change the shape by thermal treatment using a press molding method without curing the hybrid resin. The molded articles can be also remolded to change the shape by a casting or press molding method when using partially cured hybrid resins.

In one or more embodiments, the hybrid resin may have a pre-cure Tg ranging from 100 to 200° C., and a post-cure Tg ranging from 150 to 250° C. There may be at least a 50 to 100° C. differential between the pre-cure and post-cure Tg values. This differential may allow for melt-processing of the hybrid resin to occur prior to curing the resin. In one or more embodiments, the hybrid resin may be thermally cured in the temperature range of 150 to 260° C.; it may be subjected to a longer period of curing time at the lower end of the range, and a shorter period of time at the upper end of the range based on the desired application.

The shape of the cured hybrid resin may involve a powder that includes, but is not limited to, a film, chunk, fiber, and so on. The hybrid resin articles can be partially or fully cured with other hybrid resin articles together at both of the surfaces. The hybrid resin articles can be partially or fully cured with other articles such as thermoplastic resins, thermosetting resins, glass plates, fibers, or metals, at either or both of the surfaces of the resulting articles.

In one or more embodiments, the cured hybrid resin may have a 5% decomposition temperature $Td_{5\%}$ above 300° C., preferably 350° C., and more preferably 400° C.

As mentioned above, the melt viscosity of the hybrid resin may be altered, for example, through selection of the thermoplastic monomers (such as diamine and dianhydrides forming the polyimide), the size of the thermoplastic (or polyimide more specifically), as well as the type of hybrid resin formed (for example, whether the BZ groups are end caps (including the degree of end-cap conversion) or integrated into the polymer chain). Thus, for example, at a temperature of 210° C., the minimum melt viscosity may range from 50 Pa·s to over 8000 Pa·s.

In one or more embodiments, the cured hybrid resin may have a tensile strength, measured according to ASTM D1708, ranging from 30 to 130 MPa.

In one or more embodiments, the cured hybrid resin may have an elongation, measured according to ASTM D1708, ranging from 1 to 20%.

As mentioned above, in one or more particular embodiments, the hybrid resins of the present disclosure may be used to form prepregs, composite materials, adhesives, coatings, etc. Specifically, the hybrid resin composition as discussed above may be combined with reinforcement fibers to form a composite material or structure, including pre-pregs formed by impregnating a layer or weave of fibers. A resin film may be formed from the curable resin composition by, for example, compression molding, extrusion, melt-casting, or belt-casting, followed by laminating such film to one or both opposing surfaces of another layer, including for example a layer of reinforcement fibers in the form of, for example, a non-woven mat of relatively short fibers, a woven fabric of continuous fibers, or a layer of unilaterally aligned fibers (i.e., fibers aligned along the same direction), at temperature and pressure sufficient to cause the resin film to flow and impregnate the fibers. Alternatively, a prepreg may be fabricated by providing the hybrid resin composition in liquid form, and passing the layer of fibers through the liquid resin composition to infuse the layer of fibers with the heat curable composition, and removing the excess resin from the infused fibrous layer.

To fabricate a composite part from prepregs, plies of impregnated reinforcing fibers are laid up on a tool and laminated together by heat and pressure, for example by autoclave, vacuum, or compression molding, or by heated rollers, at the curing temperature range of the resin composition and at a pressure in particular in excess of 1 bar, preferably in the range of 1 to 10 bar.

Thus, in accordance with embodiments of the present disclosure, the hybrid resin may be melt-processed to apply the hybrid resin, such as to form a pre-preg, composite, coating, adhesive layer, etc. During or following such application, once the hybrid resin is desired to set, the hybrid resin may be cured to trigger ring-opening or crosslinking within the hybrid resin, thereby triggering thermosetting properties.

In the formation of a coating or adhesive layer, application of the formulated coating can be made via conventional methods such as spraying, roller coating, dip coating, etc., and then the coated system may be cured by baking.

EXAMPLES

Methods

Differential scanning calorimetry (DSC) measurements were conducted using Q2000 DSC model from TA Instruments at a heating rate of 5° C./min in the range of 20 to 350° C. in a 50 mL/min $N_2$ (nitrogen gas) flow. Glass transition temperatures (Tg) were measured from an onset of a baseline shift (intersection of two tangent lines before and after an inflection). Weight loss measurements ($Td_{5\%}$) were carried out on a Q50 TGA model from TA Instruments. Molecular weight determinations were carried out on a Shimadzu UFLC instrument fitted with Phenomenex Phenogel GPC columns for separation and having a UV and RI detection capability. The measurements were done in NMP solvent containing 10 mM of LiBr at 40° C. and referenced to polystyrene standards. $^1H$ NMR spectra were collected on a Varian Inova 500 system using $d_6$-DMSO as a solvent to calculate BZ conversion. DMA and Rheology data were collected on a RSA G2 model and a Discovery HR-2 model, respectively, from TA instruments. Tensile data were measured as per ASTM D1708 using eXpert 4200 tensile test machine from ADMET.

Solubility in THF was tested by adding about 25 mg of the material being tested to about 5 mL of THF. The mixture was then sonicated for about 5 minutes.

UV-curing was performed using either a hand-held lamp or a UV-curing machine. The hand-held UV curing lamp was obtained from VWR and has a wavelength of 365 nm, a current of 0.16 Amps and a voltage of 110V. The UV curing machine is a Heraeus LC6B Lighthammer with wavelengths in the range of 200 to 400 nm and a power of 467 watts/inch.

Polyimides

Synthesis of PI-1-0H Polyimide

A 250 mL glass bottle charged with PAP (6.003 g, 55.0 mmol), BAPP (11.289 g, 27.5 mmol) and 100 g of dioxane/methanol (1:1 w/w) solvent mix was placed in a 45° C. oil bath for 30 minutes to obtain a clear solution. BPADA (28.627 g, 55 mmol) was then added and left to stir for 4 h at 45° C., followed by overnight stirring at room temperature. The solid content of solution is 32%. The resulting cola brown varnish was filtered to remove undissolved impurities and added slowly to 400 mL of rapidly-stirred water to precipitate white polyamic acid powder. The powder was placed in an air-convection oven to imidize at 200° C. for 2.5 h. Dark red flakes of polyimide PI-1-OH were obtained at 75% yield. Tg=153° C.; $Td_{5\ \%}$=455° C. (nitrogen); Mw=4,400 Da.

Synthesis of PI-1-$NH_2$ polyimide

A 250 mL glass bottle was charged with BAPP (18.062 g, 44 mmol) and 90 g of 2-methoxyethanol solvent to obtain a clear solution. BPADA (11.451 g, 22 mmol) was then added, and the solution was left to stir for 8 h at 60° C. The solid content of solution was 25%. The resulting cola brown varnish was filtered to remove undissolved impurities and added slowly to 500 mL of rapidly-stirred water to precipitate white polyamic acid powder. The powder was placed in an air-convection oven to imidize at 200° C. for 2.5 h. Dark red flakes of polyimide PI-1-$NH_2$ were obtained at 90% yield. Tg=110° C.; Mw=3,200 Da. The structure of PI-1-$NH_2$ is shown in structure (XIII)

(XIII)

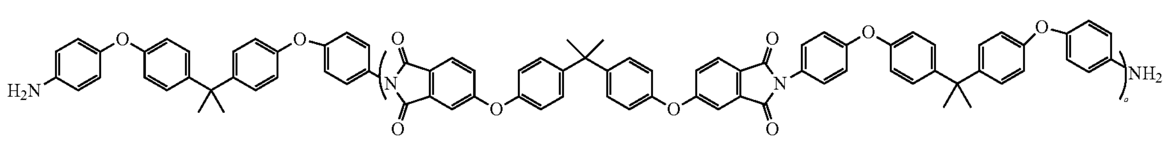

Synthesis of PI-2-OH Polyimide

The polyimide, referred to as PI-2-0H, was prepared similarly to PI-1-0H, but using a combination of RODA diamine and BPADA dianhydride along with PAP in the solvent 2-methoxyethanol. Dark red flakes were obtained at 85% yield; Tg=154° C.; Mw=3,800 Da. A second sample at a higher Mw was prepared to give 6,000 Da with Tg=164° C. A third sample at a higher Mw was prepared to give 9,500 Da with Tg=176° C. The structure of PI-2-0H is shown in structure (XIV).

(XIV)

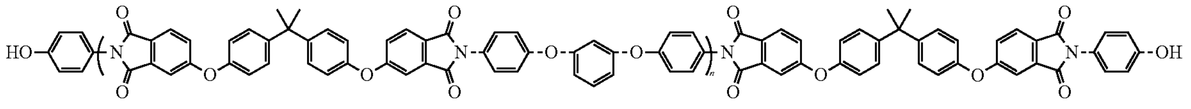

Synthesis of PI-2-$NH_2$ Polyimide

The polyimide, referred to as PI-2-$NH_2$, was prepared similarly to PI-1-$NH_2$, but using a combination of RODA diamine and BPADA dianhydride in dioxane/methanol (1:1 w/w) solvent mix. Red brown flakes were obtained at >90% yield; Tg=168° C.; Mw=17,400 Da.

Synthesis of PI-11-OH Polyimide

This polyimide, referred to as PI-11-OH, was prepared similarly to PI-1-OH, but using a combination BAPP and DDS for the diamine (at 75/25 ratio). The resulting polyimide had a Tg of 154° C. with a Mw of 4,500 Da.

Synthesis of PI-1-MA 1 g of PI-1-$NH_2$, 0.52 g of NaHCO3, 2.36 g of methacrylic anhydride and 15 ml of THF were added to a flask. The reaction took place at room temperature for 36 hrs. The product was obtained by filtration and solvent removal on a rotary evaporator. The structure of PI-1-MA is shown in structure (XV).

to reflux in a 110° C. oil bath for two days. Upon cooling, the dark red solution was prepared and added slowly to vigorously stirred MeOH (650 mL). The resulting beige-yellow powder was filtered and washed three times with deionized water and finally with MeOH. The final powder was isolated by filtration and dried at 80° C., 36 h. Yield=80%. BZ end-cap content=45% ($^1$H NMR); resin Tg=155° C.; cured Tg=200° C. A second sample was run for 5 days in the same solid content and yielded BZ end-cap at 90%; resin Tg=142° C.; cured Tg=208° C. A third sample was run for 7 days and yielded 100% BZ end-capping when starting with PI-2-OH of Mw=3,800 Da; resin Tg=120° C.; cured Tg=217° C.

(XV)

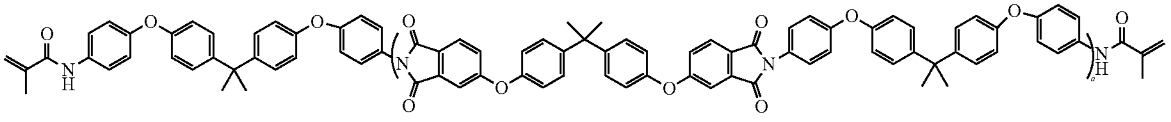

Synthesis of PI-2-EP

The PI-2-EP polyamide oligomer was synthesized by reacting PI-2-0H with epichlorohydrin in the presence of sodium hydroxide. 1 g of PI-2-0H, 5 mL of epichlorohydrin, 81 mg of NaOH and 1 mL of water were added to a flask. The reaction took place at 50° C. for 24 hrs. The product was obtained by extraction by dichloromethane followed by solvent removal in a rotary evaporator. The structure of PI-2-EP is shown in structure (XVI).

Synthesis of PI-1-BZ-E

This polyimide end-capped benzoxazine hybrid resin, referred to as PI-1-BZ-E, was prepared similarly to PI-2-BZ-E above but starting with PI-1-OH as the polyimide. BZ end-capping of 100% was noted after 1 day reflux at 22% solid content of PI in reaction medium; resin Tg=110° C.; cured Tg=155° C.

Alternatively, PI-1-BZ-E can be synthesized starting with PI-1-$NH_2$ polyimide. A flask charged with PI-1-$NH_2$ (XVI)

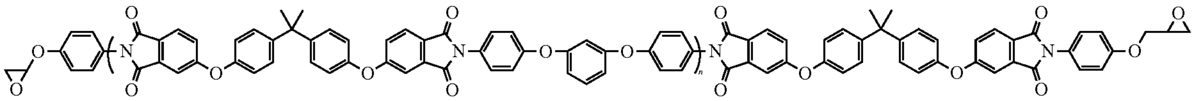

Synthesis of PI-2-EP/THPE, PI-2-EP/ODA, and PI-2-EP/YDF-170

Several different microwave-active compounds were added to the PI-2-EP. Specifically, 1,1,1-tris(4-hydroxyphenyl)ethane (THPE) (10 mg), 4,4'-Oxydianiline (ODA) (10 mg), and diglycidylether bisphenol A epoxy oligomer YDF-170 (22 mg) were added to the PI-2-EP (50 mg) in weight ratios of 10:2, 10:2 and 10:4.4, respectively. Each mixture was ground for one minute. The resulting blends are referred to as PI-2-EP/THPE, PI-2-EP/ODA, and PI-2-EP/YDF-170, respectively.

Polyimide-Benzoxazine Hybrid Resins

Synthesis of PI-2-BZ-E

This polyimide end-capped benzoxazine hybrid resin, referred to as PI-2-BZ-E, was prepared as follows: A 500 mL round bottom flask was charged with PI-2-OH (Mw=6,000 Da, 28.0 g, 0.0047 mol), paraformaldehyde (7.44 g, 0.248 mol) and treated with dioxane (120 mL). Aniline (11.54 g, 0.124 mol) dissolved in dioxane (50 mL) was added to the flask. The solid content of PI was 13%. The mixture was set (Mw=3,200 Da, 1.0 g, 0.313 mmol), phenol (0.720 g, 7.66 mmol) and paraformaldehyde (0.460 mg, 15.3 mmol) was treated with a 5.6 g solvent mixture consisting of dioxane/2-methoxyethanol (2:1 ratio, w/w). Refluxing for 24 h in a 110° C. oil bath yielded a dark red solution, which when added to methanol yielded the beige-yellow product. Near 100% BZ end-capping was noted.

Synthesis of PI-1-BZ-M

This polyimide-benzoxazine main-chain-type hybrid resin, referred to as PI-1-BZ-M, was prepared as follows: A 250 mL round bottom flask was charged with PI-1-0H polyimide (Mw=4,400 Da, 12.0 g, 0.0027 mol), paraformaldehyde (0.800 g, 0.027 mol), and ODA diamine (1.50 g, 0.0075), and treated with dioxane/2-methoxyethanol (35 g; 2:1 w/w). The mixture was set to reflux in a 110° C. oil bath for 5 days. Upon cooling, the dark red solution was diluted with additional dioxane (70 g) and filtered to remove any insoluble particles. Yellow precipitate was obtained by adding the solution slowly to vigorously stirred MeOH (400 mL), followed by washing with acetone and a second wash with MeOH. The product in powder form was filtered and dried in a vacuum oven at 70° C. for 24 h. Yield range: 80-85%. Mw=37,000 Da; resin Tg=190° C.; cured Tg=220° C.

The molecular weight of PI-1-BZ-M can be controlled by use of aniline (monoamine), in addition to ODA diamine, where the former can act as a chain-stopper. A reaction carried out similarly to the above but with the following components—PI-1-0H polyimide (Mw=4,400 Da, 15.0 g, 0.0034 mol), paraformaldehyde (1.200 g, 0.040 mol), ODA diamine (1.76 g, 0.0088 mol), aniline (0.110 g, 0.0012 mol)—over a reaction period of 3 days yielded the final product with a Mw=12,500 Da; resin Tg=183° C.; cured Tg=224° C.

Synthesis of PI-1-BZ-M2

The polyimide-benzoxazine main-chain-type hybrid resin, referred to as PI BZ-M2, was prepared similarly to PI-1-BZ-M, but the diamine BAPP was used in place of ODA for a reaction period of 3 days. Mw=8,300; resin Tg=173° C.; cured Tg=211° C.

Thin Film Molding of Hybrid Resins

Several of the PI-BZ hybrid resin powders synthesized above were molded into thin films of ca. 10 cm×10 cm×100 μm dimension. The powders were first placed in the center of a non-stick square mold, which were then placed on top of a hot-platen to initiate resin melt. Upon observation of melting, the resin was fully hot-pressed into the mold, and the temperature was elevated to cure the benzoxazine and set the resin's shape. For example: PI-2-BZ-E powder started to melt in the mold at 200° C. and was pressed for 30 minutes to fill the space of the mold completely. Following this step, the temperature was raised to 230° C. and held for 10 min while hot-pressed. Complete curing was achieved by additional 10 min holds at 240 and 250° C., after which the film was released from the mold and used for further analysis of tensile properties.

Tensile, Thermal & Melt-Viscosity Data

FIG. 8 displays the tensile properties measured from the molded thin films, along with its thermal and pre-cure resin melt-viscosity data. Improved flexibility of polyimide-benzoxazine hybrid films is noted by way of folding the film which does not result in breakage when compared to a thermosetting benzoxazine thin film such as commercially available MPD type (formula XVII) or Bis-A type (formula XVIII) BZ resins exhibiting brittleness. This is also reflected in the elongation values.

(XVII)

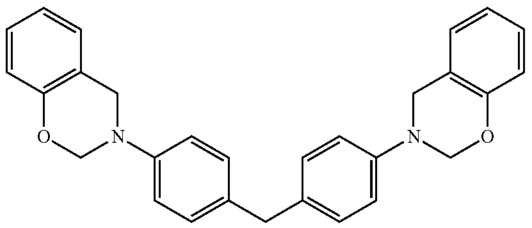

-continued (XVIII)

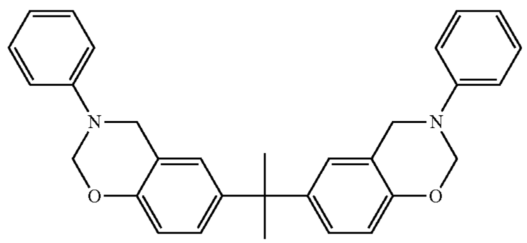

UV Curing of PI-1-MA, VP, and DMPA

PI-1-MA was blended with blended with vinyl pyrrolidine (VP) and 2,2-dimethoxy-2-phenylacetophenone (DMPA) at a weight ratio of 20:65:15 and the mixture was sonicated for about 5 minutes. The resultant mixture was a liquid at room temperature. UV radiation at 365 nm was applied to the liquid for 60 minutes.

The solubility of the resin was tested to determine the extent of crosslinking that occurred from the UV treatment. The solid was not soluble in THF, indicating effective crosslinking due to UV exposure.

UV Curing of PI-1-MA and DMPA

The UV curability of PI-1-MA without an additional monomer was tested by blending PI-1-MA with DMPA at a weight ratio of 95:5. The mixture was mixed with THF, and the THF was then evaporated resulting in a paste. UV radiation was applied to the paste for 10 seconds. After UV curing, the sample was a solid powder. The solid powder was mostly insoluble in THF, indicating that crosslinking occurred during the UV curing step. The Tg of cured PI-1-MA was also noted to increase when compared to uncured sample.

Microwave Curing of PI-2-EP/THPE, PI-2-EP/ODA, and PI-2-EP/YDF-170

The resin mixtures were cured in a microwave at 900 W for 15 minutes. Comparative samples experienced no microwave curing and were only cured via heating during the DSC experiment. The degree of microwave cure, changes to cure profile, and Tg values are noted in Table 1, below.

TABLE 1

| Sample & microwave cure duration | Appearance | DSC data (° C.) Cure peaks | Post-cure Tg | Degree of curing by microwave |
|---|---|---|---|---|
| PI-2-EP/THPE, none | Powder | 201,245 | 137 | |
| PI-2-EP/THPE, 15 min | Powder | 201,243 | 136 | 12% |
| PI-2-EP/ODA, none | Powder | 186 | 143 | |
| PI-2-EP/ODA, 15 min | Powder | 189 | 138 | 23% |
| PI-2-EP/YDF-170, none | Powder | 190 | 172 | |
| PI-2-EP/YDF-170, 15 min | Beads | 215 | Not observed | 67% |

Resin PI-2-EP does not show microwave cure on its own. However, the addition of the microwave-curable compounds improves the curability of PI-2-EP. Degree of curing is as high as 67% for the case of PI-2-EP/YDF-170 with 15 minutes of microwave irradiation. The shifting of exothermic cure peaks to higher values for the microwaved ODA and YDF mixtures is another indication of significant curing achieved by microwaves.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A hybrid thermoplastic-thermosettable resin composition, comprising:

a polymeric backbone formed from a thermoplastic unit selected from the group consisting of polyimide, polyetherimide, polyaryl ether ketone, polyphenylene sulfide, polysulfone, polyamide-imide and combinations thereof, and at least one crosslinkable benzoxazine group bonded to the thermoplastic unit, wherein the at least one crosslinkable benzoxazine group forms at least one endcap on the thermoplastic unit such that a structure of the polymeric backbone and the at least one crosslinkable benzoxazine group corresponds to the one of the following structures:

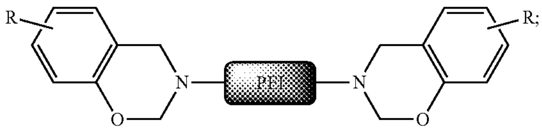

or

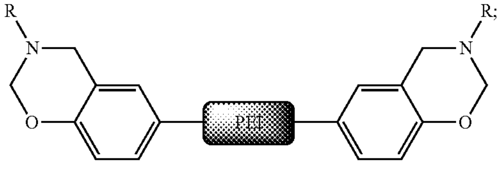

wherein R is individually selected from a hydrogen atom, a hydrocarbon group, a substituted hydrocarbon group, or a functional group, and PEI is a polyetherimide.

2. The resin composition of claim 1, further comprising the at least one crosslinkable benzoxazine group bridging thermoplastic units together, such that the structure of the polymeric backbone and the at least one crosslinkable benzoxazine group corresponds to the one of the following structures:

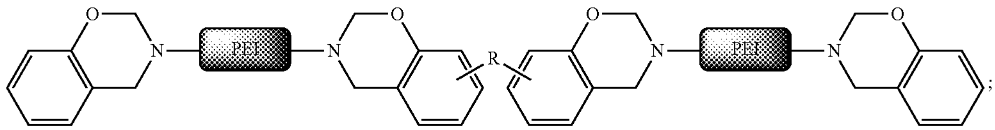

; or

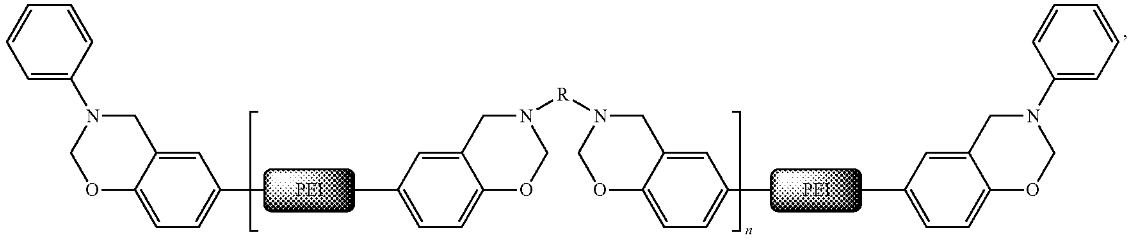

wherein R is a hydrocarbon group or a substituted hydrocarbon group, and PEI is a polyetherimide.

3. The resin composition of claim 1, wherein the resin composition has a weight average molecular weight ranging from 500 to 400,000.

4. The resin composition of claim 1, wherein a weight average molecular weight of the thermoplastic unit ranges from 500 to 20,000.

5. The resin composition of claim 2, wherein a weight average molecular weight of each thermoplastic unit ranges from 500 to 20,000.

6. The resin composition of claim 1, further comprising a UV- or microwave-curable functional group.

7. The resin composition of claim 6, wherein the UV- or microwave-curable functional group is the at least one crosslinkable benzoxazine group.

8. The resin composition of claim 6, wherein the UV- or microwave-curable group reacts with the at least one crosslinkable benzoxazine group.

9. A method of forming a hybrid thermoplastic-thermosettable resin composition, comprising:

reacting a thermoplastic to introduce a cross-linkable benzoxazine group to form the thermoplastic-thermosettable resin composition, wherein the crosslinkable benzoxazine group is bonded to a thermoplastic unit, at least one crosslinkable benzoxazine group forms at least one endcap on the thermoplastic unit such that a structure of a polymeric backbone and the at least one crosslinkable benzoxazine group corresponds to one of the following structures:

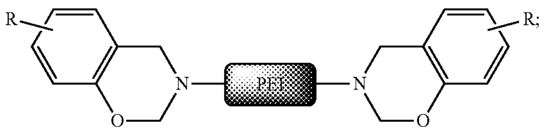

-continued or

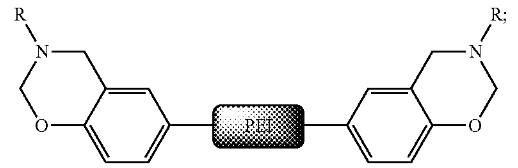

wherein R is individually selected from a hydrogen atom, a hydrocarbon group, a substituted hydrocarbon group, or a functional group, and PEI is a polyetherimide.

10. The method of claim 9, wherein the thermoplastic comprises an amine or phenol end-functionality and is reacted with formaldehyde and the other, as compared to the thermoplastic, of an amine or phenol reactant.

11. The method of claim 10, wherein the amine or phenol reactant is monofunctional.

12. The method of claim 10, wherein the amine or phenol reactant is difunctional.

13. The method of claim 10, further comprising: modifying the thermoplastic to include a UV- or microwave-curable functional group.

14. A method of forming a hybrid thermoplastic-thermoset resin, comprising:

providing a hybrid thermoplastic-thermosettable resin composition of claim 1; and curing the hybrid thermoplastic-thermosettable resin composition by an external stimulus to form the hybrid thermoplastic-thermoset resin.

15. The method of claim 14, wherein the external stimulus is selected from the group consisting of: heat, ultraviolet irradiation, microwave irradiation, and moisture.

16. The method of claim 15, wherein the hybrid thermoplastic-thermosettable resin composition further comprises UV- or microwave-curable functional groups, and wherein the external stimulus comprises ultraviolet irradiation or microwave irradiation.

* * * * *